United States Patent [19]

Straub et al.

[11] Patent Number: 5,372,115
[45] Date of Patent: Dec. 13, 1994

[54] FUEL SYSTEM FOR METHANOL FUELED DIESEL CYCLE INTERNAL COMBUSTION ENGINE

[75] Inventors: Robert D. Straub, Lowell; Robert C. Timmer, Grandville; William R. Baker, Grand Rapids; Gary W. Johnson, Farmington Hills; Roger E. Parry, Canton; Patricia A. Burkel, Royal Oak; Terri Keski-Hynnila, Canton, all of Mich.

[73] Assignee: Detroit Diesel Corporation, Detroit, Mich.

[21] Appl. No.: 757,824

[22] Filed: Sep. 10, 1991

[51] Int. Cl.⁵ .................................... F02M 37/04
[52] U.S. Cl. .................................... 123/510; 123/1 A; 418/152
[58] Field of Search ............ 123/1 A, 510, 514, 512, 123/446, 509; 418/152, 179

[56] References Cited

U.S. PATENT DOCUMENTS

| 4,372,847 | 2/1983 | Lewis | 123/510 |
| 4,522,576 | 6/1985 | Carre | 418/152 |
| 4,653,455 | 3/1987 | Eblen | 123/458 |
| 4,747,762 | 5/1988 | Fairbairn | 418/152 |
| 4,770,150 | 9/1988 | Fraenkle | 123/510 |
| 4,790,731 | 12/1988 | Freudenschuss | 123/502 |
| 4,859,162 | 8/1989 | Cox | 418/179 |
| 4,860,713 | 8/1989 | Hodgkins | 123/510 |
| 4,958,598 | 9/1990 | Fosseen | 123/1 A |
| 4,993,391 | 2/1991 | Kuribara | 123/1 A |
| 5,067,464 | 11/1991 | Rix | 123/501 |

*Primary Examiner*—Carl S. Miller
*Attorney, Agent, or Firm*—Brooks & Kushman

[57] ABSTRACT

This invention describes a fuel system for an internal combustion engine of the diesel type which is completely compatible with methanol and other low cetane liquid fuels. The fuel system is also capable of handling methanol liquid fuel, and other low cetane highly corrosive liquid fuels, of materials fully compatible with the fuel and adapted for long term durability use. Further, a fuel system is disclosed that is free of particulates of less than one micron in size thereby providing superior long term durability protection against scoring within the fuel pump and fuel delivery injectors. The invention also provides a fuel system comprising primary and secondary fuel filters, a fuel pump, and the fuel injectors designed to provide acceptable durability and reliability despite the lack of lubricity in methanol and similar fuels.

21 Claims, 4 Drawing Sheets

FUEL SYSTEM FOR METHANOL FUELED DIESEL CYCLE INTERNAL COMBUSTION ENGINE

TECHNICAL FIELD

This invention relates to methanol fueled diesel engines, and particularly a fuel system for two-cycle diesel engines.

BACKGROUND ART

Conventional diesel cycle engines in use today for vehicular and other industrial uses are fueled by a high grade fuel oil known as "No. 2 grade" and as "diesel fuel." It is a petroleum based fuel, high in hydrocarbons, has good lubricity characteristics which assists in lubricating the injectors and other moving parts exposed to the fuel prior to its being introduced into the combustion chamber, and is ignitable (with or without the assist of a glow plug) at relatively low compression ratios ranging up to as much as 19:1.

However, with the advent of concern over reducing hydrocarbons and other combustion by-product emissions into the environment, there has been increased design effort in maximizing the performance characteristics of this fuel. Some have been cost effective, i.e. higher performance, greater thermal efficiencies. Others have not, i.e. the addition of catalytic convectors.

Coincident with these concerns, has been the concern of petroleum-based fuel shortages and the need for alternative fuel sources. Among these considered are methanol and ethanol, which are low cetane liquid fuels, and natural gas which is a low cetane gas. Methanol is a particularly attractive fuel alternative since it is a liquid fuel, therefore, compatible with known liquid fuel systems, and it is a by-product of natural gas which is an abundant energy source. However, the special properties of methanol require major changes in engineering design in the engine and the air supply and fuel systems for the engine, to name a few.

Some of these changes, namely those dealing with the air supply are dealt with in U.S. Pat. No. 4,539,948 (Toeppel), assigned to the assignee of the present invention. It describes a two-cycle diesel engine for handling methanol fuels whereby the scavenging, i.e. that which sweeps the combustion chamber immediately following combustion to clear the exhaust gasses from the combustion chamber, is controlled to allow that a certain amount of hot residual gasses will remain in the combustion chamber to thereby support the auto ignition of the methanol fuel during the next power cycle.

Despite these and other prior efforts, until the present invention, there was no two-cycle diesel engine in use, fueled solely by methanol or any other low cetane liquid fuel. Nor has there been developed a fuel system which is completely compatible with the unique characteristics of a fuel such as methanol and which offers satisfactory, long-range durability and performance. The present invention is directed to those major remaining concerns.

SUMMARY OF THE INVENTION

This invention contemplates a fuel system for internal combustion engine of the diesel type which is completely compatible with methanol and other low cetane liquid fuels.

This invention also contemplates a fuel system capable of handling methanol liquid fuel, and other low cetane highly corrosive liquid fuels, of materials fully compatible with the fuel and adapted for long term durability use.

The invention further contemplates a fuel system free of particulates of less than one micron in size thereby providing superior long term durability protection against scoring within the fuel pump and fuel delivery injectors.

Further, the invention contemplates a fuel system comprising primary and secondary fuel filters, a fuel pump, and the fuel injectors designed to provide acceptable durability and reliability despite the lack of lubricity in methanol and similar fuels.

The above objects and other objects, features and advantages of the present invention are readily apparent from the following detailed description of the best mode for carrying out the invention when taken in connection with the accompanying drawings.

DETAILED DESCRIPTION OF THE INVENTION

Figure 1:
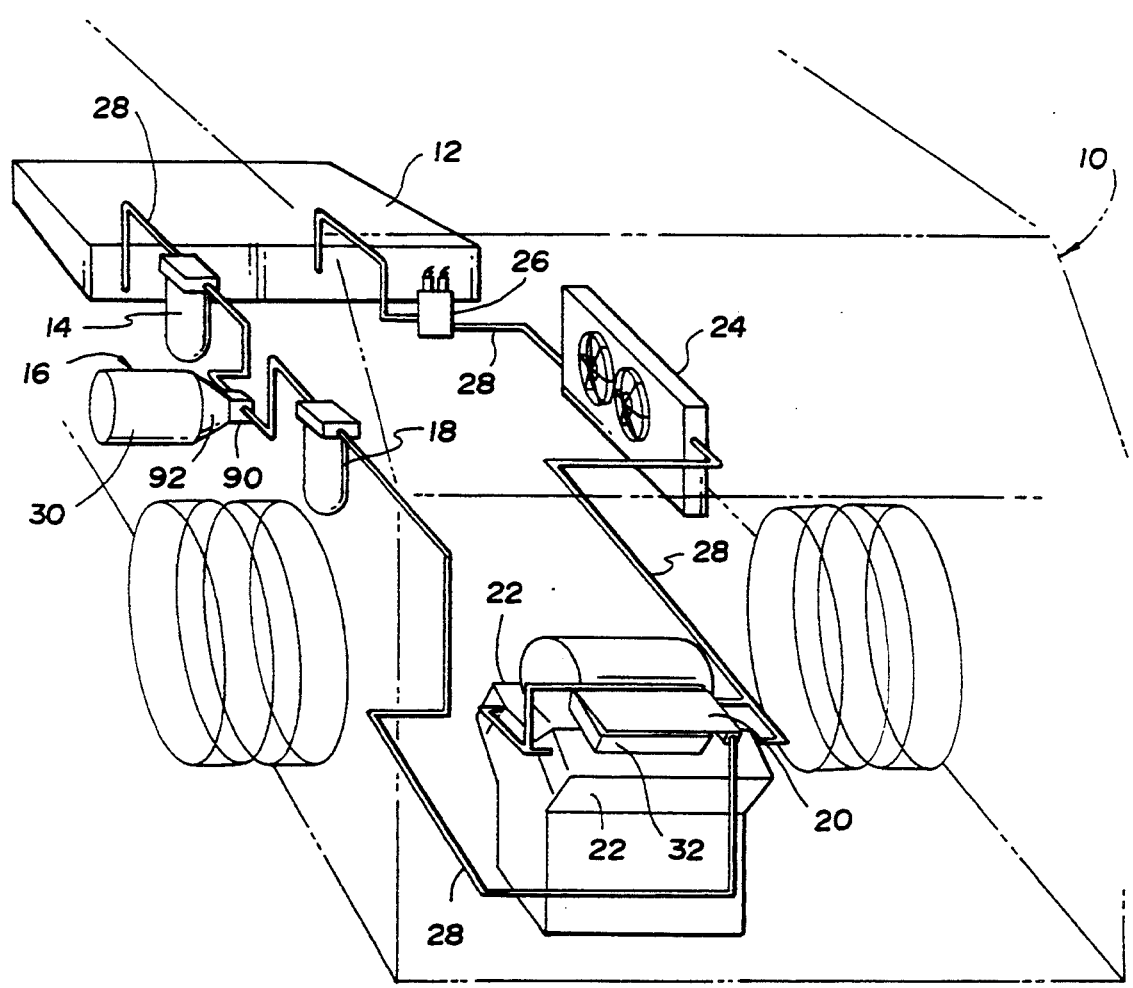
FIG. 1 is a schematically arranged perspective isometric view of the overall fuel system in accordance with the present invention.

In general, looking at FIG. 1, which generally depicts a vehicle 10, the fuel system on methanol fueled applications generally consists of a fuel tank 12, primary fuel filter 14, fuel pump assembly 16, secondary fuel filter 18, cold plate 20, fuel manifolds (integral with the cylinder head) 22, fuel injectors (not shown) within the cylinder heads 22, fuel cooler 24, a fuel block and restricted fitting 26, and fuel lines 28 running to all such components.

Because the methanol boils or turns to vapor at temperatures above 148° F. (64° Celsius), the arrangement of these various components in the fuel system has been selected so that most of the fuel system is under pressure to prevent vapor lock and insure a proper supply of fuel.

Each of the components of the fuel system are designed to work specifically with methanol and are made of materials compatible with methanol. Fuel tanks are made of stainless steel or methanol compatible fiberglass. Fuel lines are stainless steel (304 or better) or Teflon. Fuel fittings are stainless steel or nickel plated brass. However, the major design changes were regained in the fuel filters 14 and 18, the pump 16 and the fuel injectors. These are described in detail below.

In operation, fuel is drawn from the tank 12, through the primary filter 14, into the fuel pump assembly 16.

The fuel pump assembly is mounted near the fuel tank and is turned by an electric motor 30 operating off the vehicle's electrical system.

The fuel pump assembly pressurizes the fuel, forcing it through the secondary fuel filter 18, through lines to the cold plate 20.

The cold plate 20 is mounted to the top of an electronic control module (ECM) 32 and helps to cool the ECM with the fuel that flows through it. The glow plug controller may also be mounted to the top of the cold plate and kept cooled by the cold plate.

Fuel is then forced under pressure through lines 28 to the fuel inlet manifolds in each cylinder head 22. Fuel from both cylinder heads is combined in the fuel lines and routed to the fuel cooler 24.

The fuel cooler 24 removes heat from the fuel which was heated as it passed through the injectors and the cylinder head.

From the fuel cooler, the fuel passes into the restricted fitting 26 which maintains system pressure while still permitting fuel recirculation for cooling the injectors and removing any air trapped in the system.

The restricted fitting may be a special fitting or it may be a drilled passage located in a fuel block, also designated 26, which also contains a fuel pressure switch and a fuel temperature switch. Normal fuel pressure in the lines 28 downstream of the pump assembly 16 is 45 psi (310 kpa). If for any reason line pressure should drop below this level, the fuel pressure switch will turn off the fuel pump motor. Similarly, the fuel temperature switch is designed to indicate fuel temperatures above 140° F. (64° Celsius) and to provide a warning light visible to the driver if fuel temperature is above this limit.

After the fuel has pass through the restricted fitting, it then flows back to the fuel tank.

Considering now the primary and secondary fuel filter assemblies 14 and 18, these are designed to specifically filter methanol. Each is made of methanol compatible materials. The filters are canister types with replaceable synthetic media elements specially constructed for use with methanol. The primary filter assembly 14 is 99.98% efficient at removing particles larger than 10 microns. The secondary filter assembly 18 is equally efficient at removing particles larger than 1 micron.

Both primary and secondary filter assemblies are very similar in appearance and construction, as are the respective filter elements in each.

Figure 3:
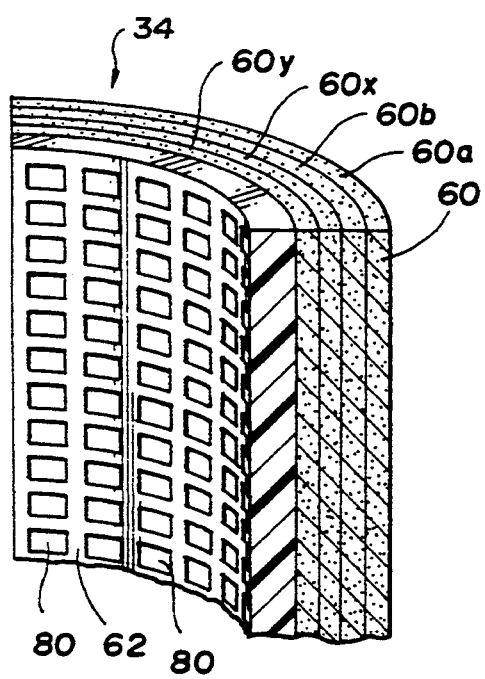
FIG. 3 is an enlarged view of a section of the filter media in accordance with the present invention and taken at any section line perpendicular to the major access of the fuel filter as shown in FIG. 2.
Figure 2:
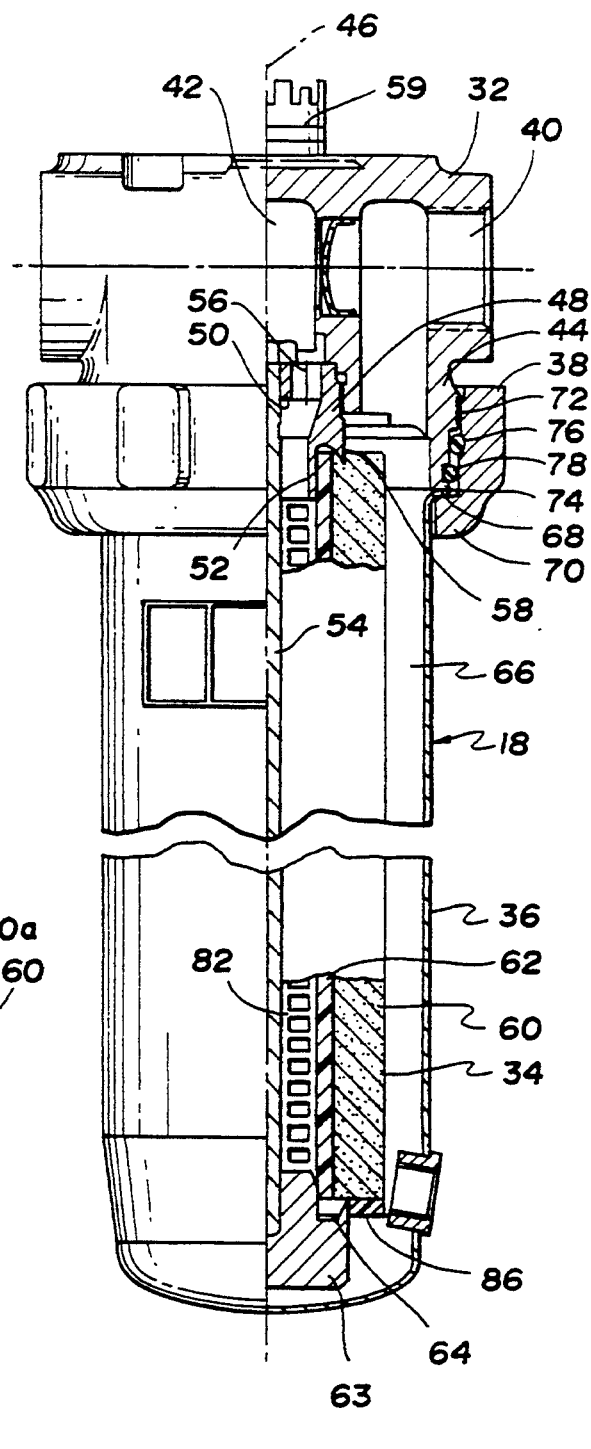
FIG. 2 is a side view of the fuel filter in accordance with the present invention shown partly in cross-section.

For description purposes, the secondary filter assembly 18 is shown in FIGS. 2 and 3. The differences between both filter assemblies and elements is explained in detail below.

The primary filter assembly 14 is located between the fuel tank and the fuel pump, on the suction side of the fuel system. The filter element is made of special, synthetic media in the shape of a long, hollow cylinder. The element does not have plastic end caps 86 as does the secondary element. The primary filter canister is also slightly longer (2.25 inches) than the primary filter canister. The canisters themselves are of the same size.

The secondary filter assembly 18 is located on the pressure side of the fuel system between the fuel pump and the injectors. It may be equipped with a differential pressure indicator mounted on top of the filter assembly.

A pressure drop of 5 psi is normal across the secondary element when new. As particulates accumulate in the filter media, the pressure differential between the filter inlet port 40 and outlet port 42 increases and when it reaches 35 psi the indicator 59 will signal the operator to prompt changing the filter element.

As seen in FIGS. 2 and 3, the filter assembly 18 primarily includes a head 32, a filter element 34 affixed to the head, a canister 36 and a lock ring 38 affixing the canister to the head. The head 32 includes a fuel inlet port 40 and a fuel outlet port 42. The lower portion 44 of the head is concentric about an axis 46 and includes a centering nut 48. Centering nut 48 includes a first centering sleeve 50 for locating the filter element 34 and a second centering sleeve 52 within which is affixed a center stud 54. The centering nut also includes one or more fuel outlet passages 56 and an axially extending, fully or partially cylindrical (about axis 46) bite lip 58 which penetrates the filter element media to additionally locate the filter element on the centering stud 54. On top of the head is located the above-mentioned pressure differential indicator 59.

The filtering element 34 generally includes a porous filter media 60 contained upon a thermoplastic cylindrical core 62. The filter element core is slip-fitted over the centering sleeve 52 and axially retained the centering stud 54 by a hand nut 63 threaded onto the centering stud at 54. The hand nut also includes a bite lip 64 similar to that of the centering nut and for the same purpose.

The canister 36 fits over the filter element in radially spaced relationship to provide an inlet chamber 66 communicating with inlet port 40. The canister includes a radially outwardly extending lip 68 at its open end which is engaged by the radially inwardly extending lip 70 of a lock ring. The lock ring is threadably connected to the head at 72 firmly clamping and sealing the canister to the head at the abutment shoulder 74. O-rings 76 and 78 recessed in the head 32 and lock ring 38, respectively, add additional sealing integrity to the assembly.

Regarding the filter element 34, as shown in detail in FIG. 3, it is seen to comprise a filter media 60 constituting a series of many laminations: 60a, 60b ... 60x, 60y. Five laminations are specifically shown, but in actual fact, there may be as many as 100 or more. These laminations may be concentric windings of many individual blankets or a single concentrically wound, convoluted blanket. In any event, a polypropylene fibrous filter material is preferred. Further, the filter element is to be constructed such that the largest particles in the fuel are filtered first (i.e. at laminations 60a, 60b) and the smaller particles are filtered last (i.e. at laminations 60x and 60y) in accordance with a gradient established by the construction of the laminations and manner in which each is applied onto the core, which forms no pat of this invention.

The established gradient for the primary filter assembly is based on filtering particles down to a 10 micron size at the bullet, and to the fuel pump assembly 16. The secondary filter assembly filters particulates beginning at 10 microns and passes those 1 micron or less in diameter.

The core 62 includes a plurality of ports 80 which allow the filtered fuel to pass to the central outlet chamber 82, thence through the outlet passage(s) 56 in the centering nut and thence through the outlet port 42.

The secondary fuel filter element 18 includes an annular thermoplastic end cap 86 bonded to at least the lower end of the filter element to preclude any delamination tendency of the filter media.

The aforesaid filter element is manufactured by the PALL Corporation under the trademark PROFILE II, Part No. HC 3300 FPD.

Another critical component in the methanol fuel system in accordance with our invention is the fuel pump assembly 16, particularly the fuel pump itself.

Figure 4:
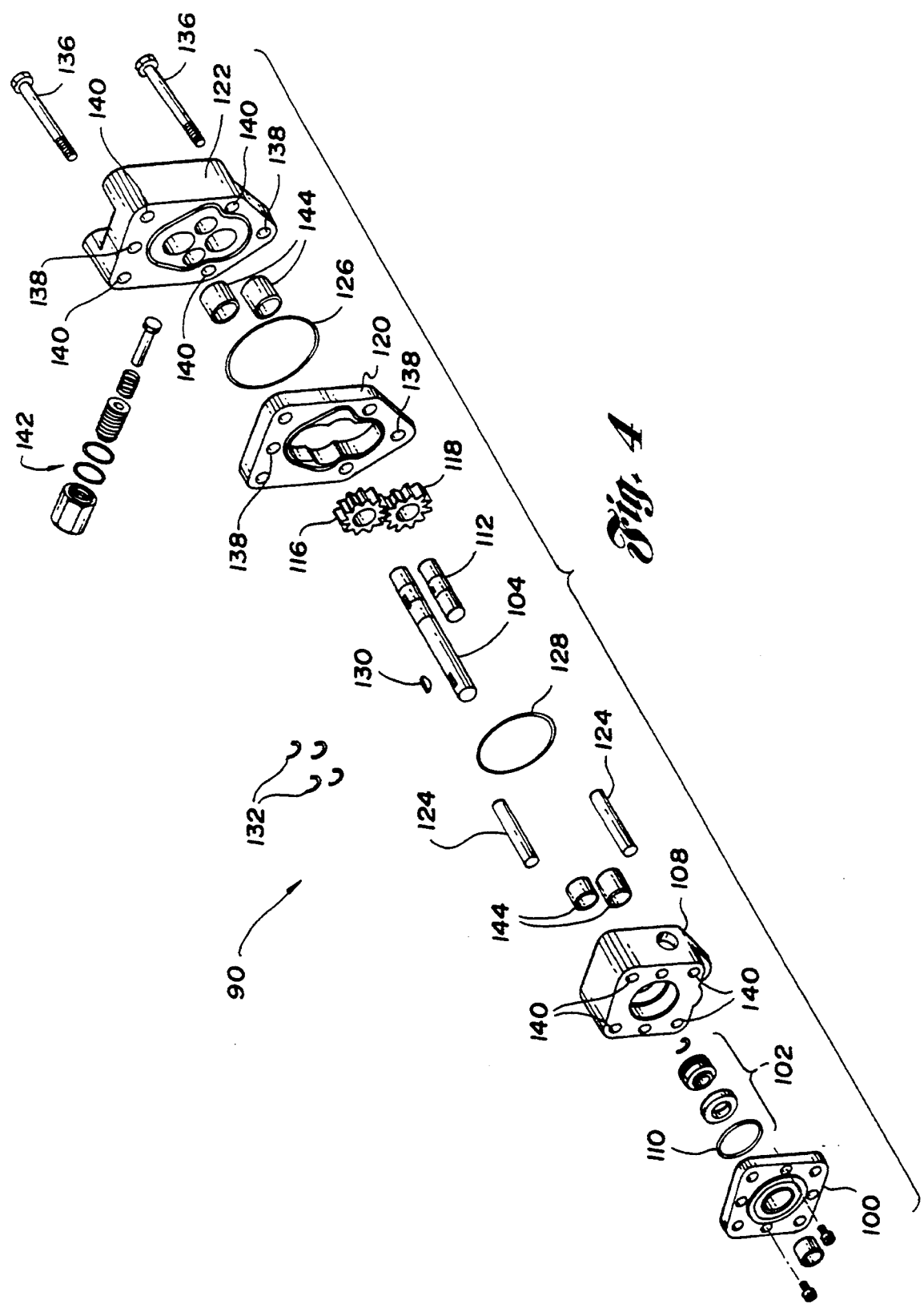
FIG. 4 is an exploded view of the fuel pump gearbox unit in accordance with the present invention.

As seen in FIG. 1, the fuel pump assembly 16 consists of the fuel pump 90, adapter 92, and electric drive motor 30. This assembly is usually mounted near the fuel tank along with the primary and secondary fuel filters. Details of the pump 90 itself are shown in FIGS. 4.

The pump most preferred for methanol applications is a positive displacement, gear-type pump and is manufactured by The Viking Pump Company, Model No. GP-0550-GOV. The pump is mounted to the motor by an aluminum adaptor or mounting flange hub 100.

The pump itself consists of an aluminum mounting flange 100 and Oilite bronze bushing assembly 102 (backing plate) which both seals and provides support for the input shaft 104 on the drive end of the pump. The flange 100 is sealed to the head or cover 108 with an O-ring seal 110. The head 108 supports one end of the driven shaft 112 and provides intermediate support for the drive shaft 104 by means of two respective needle bearing assemblies (not shown) pressed into the head.

The drive and driven gears 116, 118 are contained in a matched ground casing 120 which is supplied with the gears as a matched set. The casing 120 is aligned to the housing 122 and head 108 by two alignment sleeves 124 and is sealed to the housing by an O-ring seal 126 and groove machined into the casing (on the blind side). Likewise, the casing is sealed to the head 108 by an O-ring 128 and matting groove in the blind side of the casing.

The drive gear is retained on the shaft with a pin 130 that fits into a recess in the gear and a matching recess in the shaft. The pin is held in place by two retaining rings 132 which fit into grooves in the shaft. The driven gear is retained in a similar manner.

The head 108 further provides a cover for the casing 120, and carries the inlet and outlet fittings with inlet port 134 being shown.

The pump is held together by several bolts 136, through bolt holes 138, which also serve to secure head 108, casing 120 and housing 122, and by a second set of bolts (not shown) which pass through bolt holes 140 to secure all pump components together and to mount the pump to the pump adapter 92. If desired, an internal pressure relief valve 142 may be provided.

Compatibility of pump materials with methanol fuel is critical to such a pump having the requisite durability for diesel engine operations. Not only is the fuel corrosive, it has no inherent lubricating properties. Thus, general deterioration, spalling and scoring, to name a few, become major concerns. Consequently, a particular combination of pump component materials is preferred. Namely, the head 108, casing 120 and housing 122 are cast iron. The gears 116 and 118 are made of a polypropylene sulfide plastic, preferably that sold under the trademark Ryton by Phillips Petroleum Corporation.

The bushings 144, intermediate the needle bearing assemblies and respective drive and driven gear shafts 104, 112 are of carbon graphite. The O-rings 110, 128, 126 are of BUNA-N and the drive and driven shafts 104, 112 are of carbon nitride steel. All other metal parts (bolts 136, etc.) are plated steel. The result of this unique and particular combination of materials, particularly the Ryton gears, is an especially durable methanol fuel pump assembly.

Figure 5:
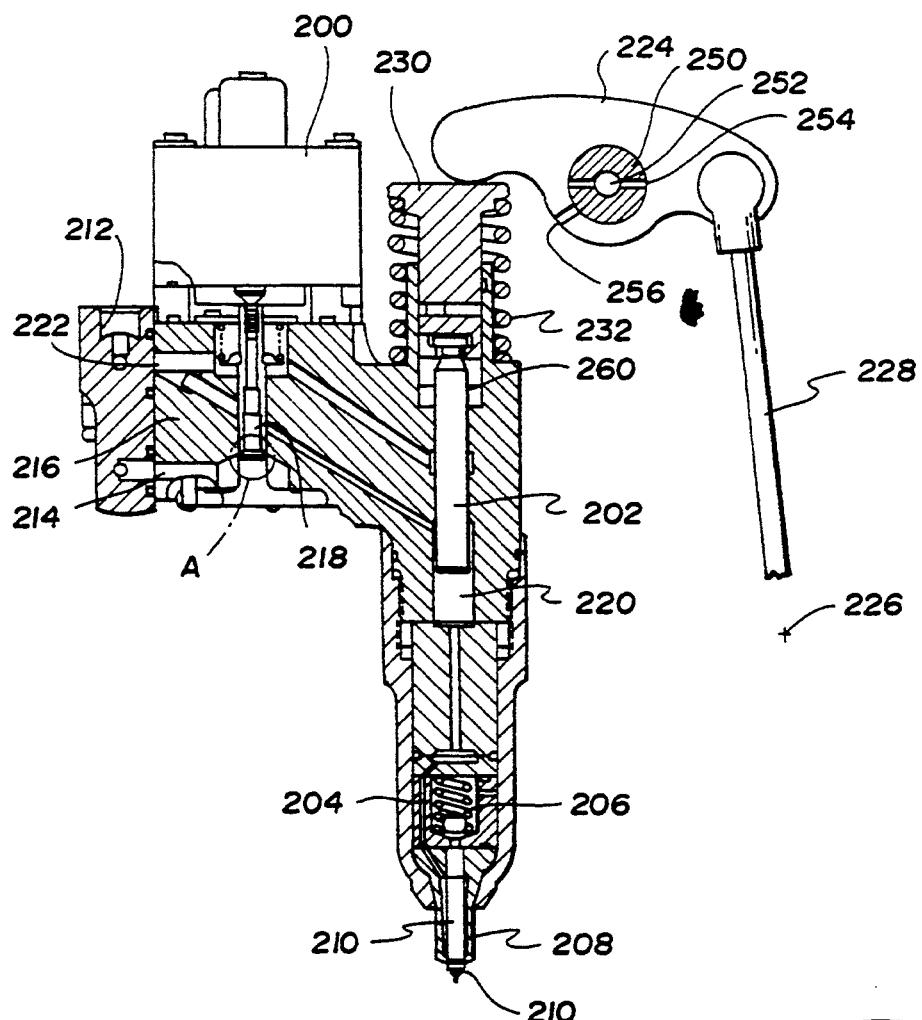
FIG. 5 is a side view of a fuel injector unit and rocker arm assembly shown in partial cross-section and illustrating a further distinctive feature of the fuel system in accordance with the present invention.

In accordance with our invention, a final consideration in the fuel system is the construction and operation of the fuel injectors. FIG. 5 shows a typical electronic unit fuel injector (EUI). The general structure and operation thereof is shown in U.S. Pat. No. 4,392,612, and the subject matter thereof is incorporated herein by reference.

The EUI injector is particularly preferred for all methanol fueled engines. No mechanical injectors are used with methanol. The injector times, meters, pressurizes, and atomizes fuel.

Timing and metering are accomplished by the solenoid valve 200 which is controlled by the electronic control module (ECM) 32. By closing the solenoid valve, fuel is trapped under the plunger 202 during the plunger's downward travel. When the solenoid valve closes determines when the beginning of injection occurs. How long the valve remains closed during the plunger's downward travel determines how much fuel will be injected during that stroke.

Pressurization and atomization are accomplished in the following manner. As fuel is trapped under the plunger 202 during its downward stroke, the fuel is forced through passages 204 in the spring cage 206 down into the spray tip 208. The needle valve 210 in the spray tip is spring loaded in the closed position. As the plunger creates more and more force on the trapped fuel, the fuel is able to overcome the spring force holding the needle valve closed.

The high pressure required to open the needle valve is called the "pop" pressure as the needle valve opens very rapidly once the tension of the needle valve spring is overcome.

When the needle valve opens, fuel, under high pressure, is forced out of the injector tip 208 through the spray tip holes 210. Because the holes in the tip are very small and the fuel is under very high pressure, the fuel breaks up into small droplets or is atomized. This allows the heat in the combustion chamber to quickly vaporize the fuel so it can combine with the air and burn creating combustion.

In operation, fuel, under pressure, enters the injector through the fuel manifold inlet and passes through a filter on the inlet side. Fuel flows into a passage 222 drilled in the injector body 216, past the solenoid valve 218, and is directed to the area under the injector plunger. The fuel, as it passes the solenoid valve, is also allowed to flow down past the valve through passage 214 and out of the injector through the fuel outlet manifold. This continuous flow of fuel through the injector both cools the injector and allows any air trapped in the fuel to flow out of the system and be vented to atmosphere in the fuel tank.

The motion of the plunger 202 in the injector body is controlled by the injector rocker arm 224 which is, in turn, controlled by the camshaft, shown schematically at 226. As the camshaft rotates, the injector lobe forces the cam follower up, moving the pushrod 228 up, pushing up on the clevis end of the injector rocker arm 224. The injector rocker arm rotates, forcing the follower 230 and the plunger 202 down against the force of the injector follower spring 232. As the camshaft rotates further, the plunger reaches the bottom of its stroke, and the action is reversed. The plunger moves upward due to the expansion of the injector follower spring and is controlled by the injector lobe on the camshaft. This cycle is repeated every revolution of the engine, in every cylinder.

As fuel is circulated through the injector body, the plunger is moving up and down in its bore. However, injection will not occur until fuel is trapped under the plunger.

Injection occurs when the solenoid valve 218 closes, and the fuel can no longer flow out the fuel outlet manifold. As the plunger continues its downward travel, the fuel is pressurized. The pressurized fuel flows through passages 204 in the injector valve spring cage, past the check valve, and into the injector tip 210. The plunger continues downward, increasing the pressure on the fuel, until the pressure is sufficient to open the needle valve against the tension of the needle valve spring. Once the valve is open, the fuel is injected, under high pressure, into the combustion chamber. The atomized fuel is vaporized by the heat in the combustion chamber and combines with the air to burn creating combustion. This combustion forces the piston down creating power.

Beginning of injection (BOI) is determined by when the solenoid valve is closed during the plungers downward stroke.

The amount of fuel injected is determined by how long the solenoid valve 218 is closed during the plungers downward stroke. The longer the valve is closed, the more fuel is injected per plunger stroke.

The foregoing is generally descriptive of an EUI injector operation. However, in accordance with our invention, the following critical design modifications were conceived to assure the injector being able to withstand the effects of a methanol fuel. Scoring is of particular concern since methanol lacks the lubricity of petroleum-based fuels. A lubricating additive can be used, and in our fuel system is preferred, for example as supplied by Lubrizol Corporation and sold under DDC Part No. 23509970.

Other plunger modifications including ceramics, dry-film lubricants and ion-implantation may also offer improvements but are not considered necessary in light of the injector modifications described below.

The plunger 202 is made of 51501 stainless steel, nitrided, and thereafter provided with a lapped surface finish ranging from 2-6 microinches, preferably about 4 microinch.

Figure 6:
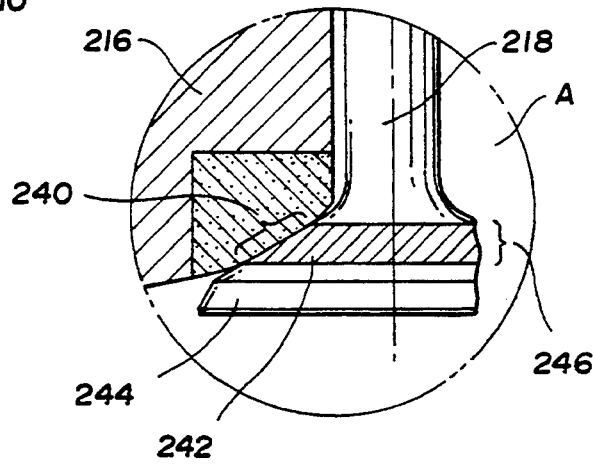
FIG. 6 is an enlarged view of the portion of the injector unit of FIG. 5 represented by the circled segment A.

Similarly, the solenoid valve 218 (shown enlarged in FIG. 6) is made of A-6 tool steel with its guide surface ground to a surface finish of 1 to 4 microinches. The injector body and thus the seat 240 is preferably of 4140 nitriding steel. Alternatively, the solenoid valve seat 240 may be in the form of a separate insert 242 made of 51501 nitrided stainless steel. Still another unique and preferred feature is to provide valve seat 240 and mating seat 242 on valve head 244 with a band width contact across a seating band of substantial length, as designated at 246, at least equal to that which might be expected to be encountered over a period of substantial use if the conventional line contact were permitted. This is generally in the order of about 0.005 to 0.020 inches, with the valve seat bore diameter equalling about 7 mm (0.271 inches). Such a bandwidth contact pattern may be created by lapping the valve to its seat with an abrasive compound to a surface finish of about 1-4 microinches, preferably about 1 microinch. This eliminates any inconsistencies which would otherwise be encountered where the combination of valve and valve body seat are simply allowed to "wear in" over time. In doing so, erosive deterioration in this area is reduced to a negligible amount. The micron sized particulates in the fuel as admitted by the secondary fuel filter 18, described above, has virtually no effect on the durability and operation of the injector.

Finally, while finer fuel filtration and lapping improved plunger scoring in our preferred embodiment there is provided an engine oil "squirter" system for assuring an abundant supply of engine oil is provided to the top portion of the plunger 202 to lubricate that portion of the plunger which reciprocates in and out of the injector body. Looking at FIG. 5, the rocker arm 224 is pivotally mounted on a shaft 250 having an axially extending oil passage 252 and at least two diametrically opposed radial bores 254 which pass engine oil under pressure to a bore 256 located in the rocker arm and directed toward the bottom portion of the follower 230. Oil is thereby squirted in the follower 230 and will drip or effectively be pumped down to the top portion of plunger 202 within the area designated 260.

Thus, taken together, the hardware changes to the filters, pump, and injectors, together with the lubricity fuel additive, provide a fuel system fully capable of eliminating certain of the operationally harmful characteristics of methanol on the one hand, and compensating for the remaining harmful characteristics of this fuel, to thereby provide an efficient and durable system.

While the best modes for carrying out the invention have been described in detail, those familiar with the art to which this invention relates will recognize alternative designs and embodiments for practicing the invention. Thus, the above described preferred embodiment is intended to be illustrative of the invention which may be modified within the scope of the following appended claims.

What is claimed is:

1. A fuel system for providing methanol fuel to the combustion chamber of an internal combustion engine, said fuel system comprising:
   a primary fuel filtering assembly;
   a secondary fuel filtering assembly;
   a fuel pump; and
   a fuel injector assembly;
   said primary filter assembly being on the upstream suction side of the fuel pump and being operative to filter from the fuel particulates exceeding about 10 microns;
   said secondary filter assembly being on the downstream pressure side of the fuel pump and being operative to filter from the fuel particulates exceeding about 1 micron;
   each of said primary filtering assembly, secondary filter assembly, fuel pump and injector comprising materials capable of resisting the effect of liquid methanol including scoring, corrosiveness and lack of lubricity;
   at least one of said primary and secondary filter assemblies comprising:
   a filter head having an inlet port and an outlet port;
   a filter element disposed between said inlet port and said outlet port such that fuel passing through said inlet port will be caused to flow through said filter element to said outlet port;
   said filter element including a polypropylene fibrous filter material of varying permeability from one side thereof to the other side thereof such that the largest particulates will be first filtered out and the smallest particles will be last filtered out; and said filter head including a differential pressure sensor for (a) measuring differential fuel pressure across said inlet port and said outlet port and (2) emitting a warning signal when the differential pressure exceeds a predetermined amount.

2. In a fuel system for supplying methanol fuel to the combustion chamber of a fuel injected internal combustion engine;

a fuel injector member;

said fuel injector member being an electronic unit fuel injector having a fuel inlet and a fuel outlet within said housing and an electromagnetically actuated solenoid valve member, a fuel passage within said housing having an annular conical valve seat at one end thereof, said fuel inlet being in open communication with said fuel passage at one end thereof, and said fuel outlet being in open communication with the other end of said passage;

said solenoid valve member including a reciprocable valve stem having an annular conical valve head at one end thereof and adapted to reciprocate between a closed position in sealed engagement with said valve seat whereby no fuel is allowed to pass past said valve seat and an open position;

said valve head and valve seat being in sealed contact with one another in the closed position around the entire circumference thereof to define a circumferential sealing contact band of substantial length thereby eliminating any measurable increase in the length of said contact band as the injector is used over time.

3. A fuel system for providing methanol fuel to the combustion chamber of an internal combustion engine, said fuel system comprising:

a primary fuel filtering assembly;

a secondary fuel filtering assembly;

a fuel pump; and a fuel injector assembly;

said primary filter assembly being on the upstream suction side of the fuel pump and being operative to filter from the fuel particulates exceeding about 10 microns;

said secondary filter assembly being on the downstream pressure side of the fuel pump and being operative to filter from the fuel particulates exceeding about 1 micron;

each of said primary filtering assembly, secondary filter assembly, fuel pump and injector comprising materials capable of resisting the effect of liquid methanol including scoring corrosiveness and lack of lubricity;

at least one of said primary and secondary filter assemblies including:

a filter head having an inlet port and an outlet port;

a filter element disposed between said inlet port and said outlet port such that fuel passing through said inlet port will be caused to flow through said filter element to said outlet port; and said filter element including a polypropylene fibrous filter material of varying permeability from one side thereof to the other side thereof such that the largest particulates will be first filtered out and the smallest particles will be last filtered out.

4. The fuel system as in claim 3 wherein said filter element comprising a series of laminated layers of said filter material; and each successive said layer is adjusted to filter particulates of smaller size than the preceding one of said layers.

5. The fuel system as in claim 4 wherein said filter head includes an elongate centrally located outwardly depending stud, said filter element being in the form of an elongate cylinder coaxially disposed on said stud and radially spaced therefore to form a first fuel chamber communicating with one of said inlet and outlet ports;

a canister coaxially disposed about said filter element and radially spaced therefrom to form a second fuel chamber communicating with the other of said inlet and outlet ports.

6. The fuel system of claim 5 wherein said filter element includes a plastic end cap bonded to one end of said filter element and thereby precluding any radial separation of said laminations.

7. The fuel system of claim 6 wherein said filter element includes an elongate rigid plastic cylindrical inner core member fixed to the adjoining said series of laminated layers of polypropylene fibrous filter material and having a series of openings therethrough by which fuel may pass from one side of the filter element the other side thereof.

8. The fuel system of claim 7 wherein said inner core member is located on the inner diameter of said filter element;

said filter head including a centering nut member having a first axially extending centering sleeve for locating the filter head relative to said center stud and having a second axially extending centering sleeve coaxial with the first centering sleeve for locating the filter element relative to said filter head and in telescoping engagement with said plastic inner core member.

9. The fuel system of claim 7 wherein said filter head includes a differential pressure sensor for (a) measuring differential fuel pressure across said inlet port and said outlet port and (2) emitting a warning signal when the differential pressure exceeds a predetermined amount.

10. The fuel system as in claim 8 wherein said fuel pump comprises a positive displacement gear-type pump having a pair of interengaging gears;

one of said gears being a drive gear, the other of said gears being a driven gear;

each said gear being made of polypropylene sulfide plastic material, said pair of gears being matched.

11. The fuel system of claim 10 wherein said fuel pump includes a casing within which said pair of gears are radially located thereby defining a pumping chamber;

said casing being cast iron and the internal surfaces thereof which define said pump chamber being lapped to thereby provide a pumping surface highly resistant to any tendencies toward scoring as may be caused by the relatively abrasive nature of methanol fuel.

12. The fuel system of claim 11 wherein the drive and driven gears are supported by rotation within said pump by a drive shaft and driven shaft, respectively, and wherein each said shaft is comprised of carbon nitride steel.

13. A fuel system for providing methanol fuel to the combustion chamber of an internal combustion engine, said fuel system comprising:

a primary fuel filtering assembly;

a secondary fuel filtering assembly;
a fuel pump; and
a fuel injector assembly;
said primary filter assembly being on the upstream suction side of the fuel pump and being operative to filter from the fuel particulates exceeding about 10 microns;
said secondary filter assembly being on the downstream pressure side of the fuel pump and being operative to filter from the fuel particulates exceeding about 1 micron;
each of said primary filtering assembly, secondary filter assembly, fuel pump and injector comprising materials capable of resisting the effect of liquid methanol including scoring, corrosiveness and lack of lubricity;
said fuel injector assembly including at least one fuel injector member;
said fuel injector member including an injector housing, a reciprocable plunger located within said housing, one portion of said plunger being located outside said housing;
a spring biased follower coaxially located at one end of said plunger and in constant engagement with said one portion of said plunger;
said fuel injector assembly further including means for squirting engine oil under pressure directly to said one portion of said plunger.

14. The fuel system of claim 13 wherein said oil squirting means includes a rocker arm member, said rocker arm member including a central bore, a rocker arm support shaft extending through said bore and providing an axis upon which the rocker arm is adapted to pivot in response to a timed sequence established by a camshaft;
said rocker arm including a radially extending oil passage from said bore and directed toward said one portion of said plunger and said follower; and
means for admitting engine oil under pressure to said bore whereby engine oil will be squirted through said rocker arm passage.

15. A fuel system for providing methanol fuel to the combustion chamber of an internal combustion engine, said fuel system comprising:
a primary fuel filtering assembly;
a secondary fuel filtering assembly;
a fuel pump; and
a fuel injector assembly;
said primary filter assembly being on the upstream suction side of the fuel pump and being Operative to filter from the fuel particulates exceeding about 10 microns;
said secondary filter assembly being on the downstream pressure side of the fuel pump and being operative to filter from the fuel particulates exceeding about 1 micron;
each of said primary filtering assembly, secondary filter assembly, fuel pump and injector is comprised of materials capable of resisting the effect of liquid methanol including scoring, corrosiveness and lack of lubricity;
said fuel injector assembly including at least one fuel injector member;
said fuel injector member being an electronic unit fuel injector having a fuel inlet and a fuel outlet within said housing and an electromagnetically actuated solenoid valve member, a fuel passage within said housing having an annular conical valve seat at one end thereof, said fuel inlet being in open communication with said fuel passage at one end thereof, and said fuel outlet being in open communication with the other end of said passage;
said solenoid valve member including a reciprocable valve stem having an annular conical valve head at one end thereof and adapted to reciprocate between a closed position in sealed engagement with said valve seat whereby no fuel is allowed to pass past said valve seat and an open position; and
said valve head and valve seat being in sealed contact with one another in the closed position around the entire circumference thereof to define a circumferential sealing contact band of substantial length thereby eliminating any measurable increase in the length of said contact band as the injector is used over time.

16. The fuel system as in claim 15 wherein said valve head includes a surface finish of about 1–4 microinches and said valve seat has a surface finish ranging from about 1 to 4 microinches.

17. The fuel system as in claim 16 wherein said solenoid valve is made of A-6 tool steel.

18. The fuel system as in claim 16 wherein said valve seat is made of 4140 nitrided stainless steel.

19. The fuel system as in claim 17 wherein said valve seat is made of 4140 nitrided stainless steel.

20. The fuel system as in claim 19 wherein said fuel injector member further includes an injector housing, a reciprocable plunger located within said housing, one portion of said plunger being located outside said housing;
a spring biased follower coaxially located at one end of said plunger and in constant engagement with said one portion of said plunger;
said fuel injector assembly further including means for squirting engine oil under pressure directly to said one portion of said plunger;
wherein said oil squirting means includes a rocker arm member, said rocker arm member including a central bore, a rocker arm support shaft extending through said bore and providing an axis upon which the rocker arm is adapted to pivot in response to a timed sequence established by a camshaft;
said rocker arm including a radially extending oil passage from said bore and directed toward said one portion of said plunger and said follower; and
means for admitting engine oil under pressure to said bore whereby engine oil will be squirted through said rocker arm passage.

21. The fuel system of claim 20 wherein said primary and secondary filter assemblies comprise a filter head having an inlet port and an outlet port;
a filter element disposed between said inlet port and said outlet port such that fuel passing through said inlet port will be caused to flow through said filter element to said outlet port; and
said filter element including a polypropylene fibrous filter material of varying permeability from one side thereof to the other side thereof such that the largest particulates will first be filtered out and the smallest particles will be last filtered out.

* * * * *